United States Patent Office 2,873,845
Patented Feb. 17, 1959

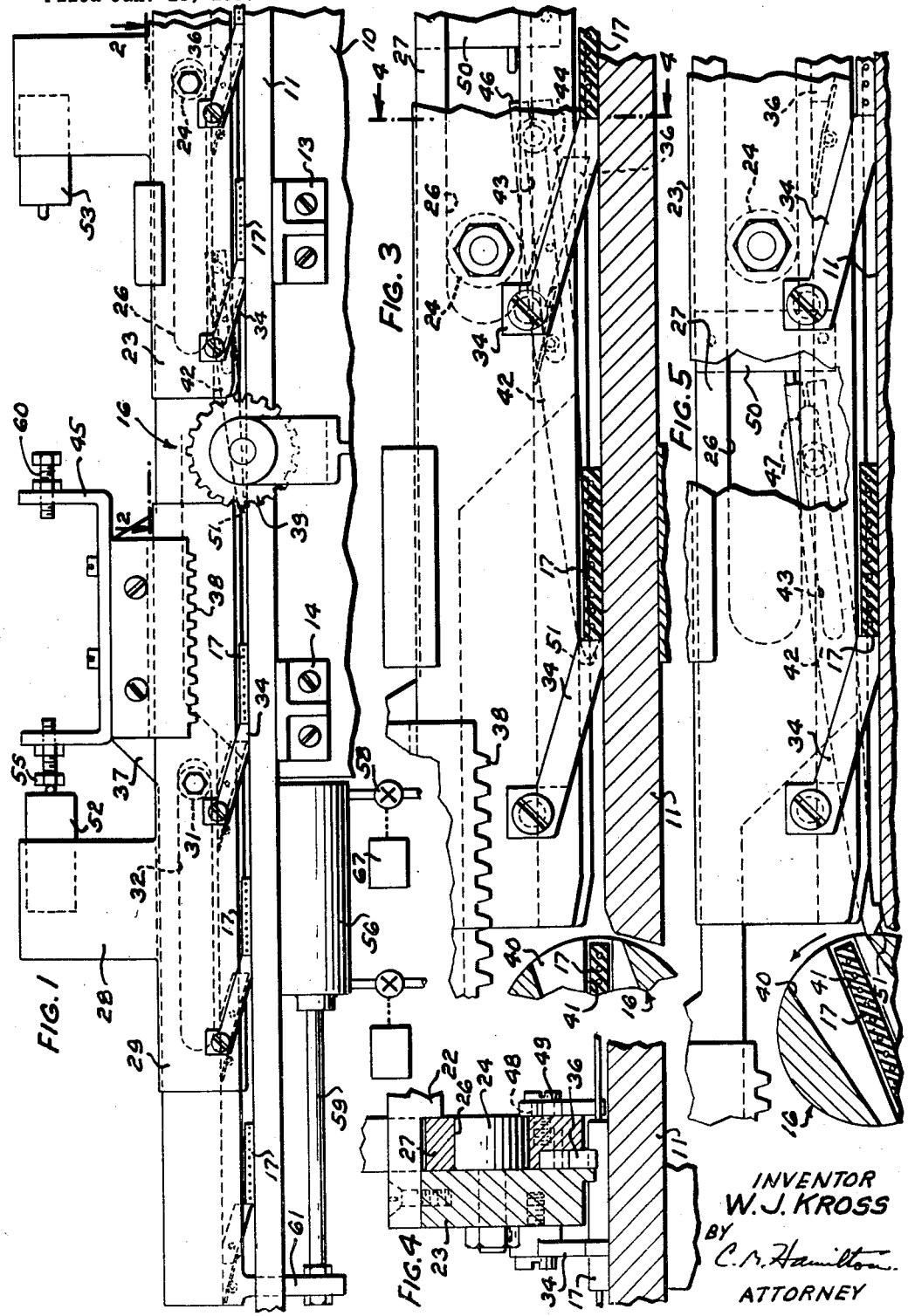

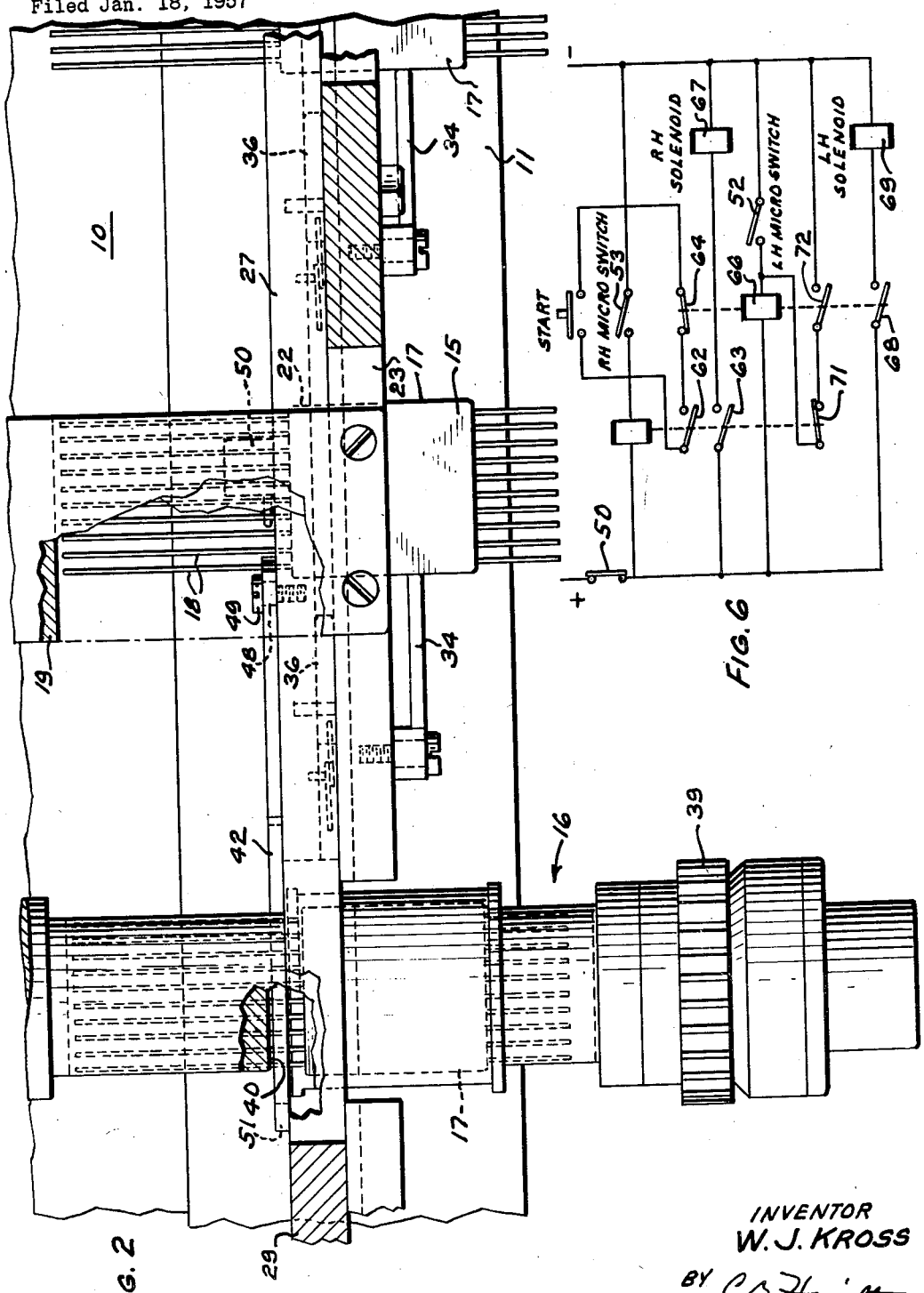

2,873,845
SAFETY DEVICE FOR ARTICLE FEEDING MECHANISM

William J. Kross, Chicago, Ill., assignor to Western Electric Company, Incorporated, New York, N. Y., a corporation of New York Application January 18, 1957, Serial No. 634,868

7 Claims. (Cl. 198—221)

This invention relates to an article feeding mechanism, and more particularly to a feed mechanism that normally operates in synchronism with a fabricating machine together with facilities for interrupting operation of the feed mechanism upon existence of non-synchronous operating conditions.

Heretofore numerous automatic feed mechanisms have been devised to feed work pieces to synchronously operated fabricating machines. Often it is necessary that the feed mechanism move within a rotating or reciprocating machine and positively engage the fabricating article to effectuate a withdrawal thereof. In such instances it is absolutely essential that complete synchronism be maintained between the moving mechanisms otherwise there is a clash or jamming of elements resulting in severe damage or breakage of one or more of the mechanisms.

It is a primary object of the present invention to provide a safety device for interrupting operation of an article feed mechanism upon encountering any interfering, overloading or jamming conditions.

Another object of the invention resides in a transfer mechanism having improved hook-like members for positively engaging and withdrawing parts from a cyclically operable fabricating machine.

An additional object of the invention is to provide a reciprocating transfer mechanism having an article engaging element capable of movement relative to the remainder of the mechanism upon being blocked from normal movement.

Commensurate with the last object, the invention features a switch operated by relative movement between the article engaging element and the remainder of the transfer mechanism for interrupting further operation of the transfer mechanism.

With these and other objects in view, the present invention contemplates a reciprocating type of transfer mechanism having a hook-like member for positively engaging and withdrawing articles from a cyclically operating fabricating machine. A slip joint is provided between the hook-like member and the remainder of the transfer mechanism whereby the hook member may move relative to the transfer mechanism upon being blocked from normal operation. The control of the operation of the transfer mechanism is obtained by means of an electrical circuit having a switch therein adapted to be operated by the hook-like member moving relative to the remainder of the transfer mechanism. This switch when operated functions to interrupt the operation of the control circuit to preclude further operation of the transfer mechanism, and thereby preclude damage to the transfer mechanism or to the associated fabricating machine.

Other objects and advantages of the present invention will be apparent from the following detailed description when considered in conjunction with the accompanying drawings, wherein Fig. 1 is a side elevational view of a transfer mechanism for advancing parts in a step-by-step fashion in accordance with principles of the present invention;

Fig. 2 is an enlarged top plan view taken along line 2—2 of Fig. 1 looking in the direction indicated by the arrows;

Fig. 3 is a side elevational view illustrating a hook-like member normally advancing an article;

Fig. 4 is a sectional view taken along lines 4—4 of Fig. 3 illustrating the mounting for a reciprocating transfer bar having mounted thereon an article advancing pawl and an article advancing hook-like member;

Fig. 5 is a side elevational view showing the relative positionment of the parts of the transfer mechanism when a normal operation of the mechanism is blocked; and Fig. 6 is a circuit diagram illustrating a control means for the transfer mechanism shown in the other views.

Referring first to Fig. 1, there is shown a base 10 having mounted thereon a work feed bed 11 by means of a pair of brackets 13 and 14. Parts to be fabricated are advanced along the bed 11 to a fabricating machine generally designated by the reference numeral 16. The particular parts utilized to illustrate the present invention are wire spring relay combs 17 each of which consists of a phenolic block 15 as best illustrated in Fig. 2, having extending therethrough a plurality of laterally spaced wires 18. It is to be understood that the present invention will be readily adapted to the feed of many diverse types of parts. The fabricating machine 16 selected to illustrate the principles of the present invention is a device for rotating the parts 180° as they are advanced along the bed 11. This turnover device is further described in greater detail in the copending application of C. R. Rasmussen, Serial No. 636,779, filed January 28, 1957. It is to be further understood that numerous other types of fabricating machines could be substituted for the one illustrated, and the principles of the present invention readily incorporated in transfer devices to be associated therewith.

Extending from the base 10 is a frame section 19 having laterally extending therefrom a support member 22 (see Figs. 2 and 4). Attached to and depending from the outer extremity of the member 22 is an elongated plate 23 having mounted thereon a roller 24 adapted to fit within an elongated slot 26 formed in a transfer bar 27.

Looking at the lefthand section of Fig. 1, it will be noted that a second frame section 28 is provided and has attached thereto a second plate 29 identical to the plate 23. This plate also has mounted thereon a roller 31 adapted to ride within a second slot 32 formed in the transfer bar 27. The rollers 24 and 31 operating within the slots 26 and 32 permit the transfer bar 27 to be reciprocated within the limits defined by the slots.

Pivotally mounted on the plates 23 and 29 are a plurality of spring-biased holding pawls 34 that are adapted to be lifted by movement of combs 17 therebeneath. Pivotally mounted on the transfer bar 27 are a plurality of spring-biased feed pawls 36 adapted to engage and advance the combs 17 beneath the holding pawls 34 upon each movement of the transfer bar 27 toward the right.

The transfer bar is provided with an offset section 37 adapted to span the turnover device 16. Attached to section 37 is a rack 38 adapted to actuate a gear 39 attached to the turnover device 16. The turnover device 16 is provided with a cavity 41 for accommodating a comb 17. When the rack 38 engages the gear 39, the turnover device is rotated 180° to rotate the comb positioned therein. For a further description of the turnover device, attention is respectfully directed to the aforeidentified copending application of C. R. Rasmussen.

In order to withdraw a comb from the turnover device 16 a hook-like member 42 is provided. This member has an elongated slot 43 formed therein to provide two tangs 44 and 46. As best illustrated in Fig. 5, it will be noted that the slot 43 has an enlarged portion 47 that is mounted on a shank 48 of a screw 49 secured to the transfer member 27. The slot 43 is of such width that the tangs 44 and 46 are resilient and thus provide a slip joint between the member 42 and the shank of the screw 49. The lower extremity of member 42 has a cam surface 51 formed thereon to pivot the member when it engages a comb 17 held in the turnover device 16.

During normal operations, the hook-like member enters a slot 40 formed in the turnover device 16 (see Fig. 3) and simultaneously therewith, the resilient pivot joint established by tangs 44 and 46 encompassing the shank 48 of the screw 49 permits the cam surface 51 to pivot the member 42 over the held comb 17. If the lower extremity of the member 42 engages a non-yieldable element of the turnover device 16 (such as shown in Fig. 5), then the shank 48 exerts a force on the tangs 44 and 46 to permit the tang to spread apart and the shank will then ride within the slot 43.

It may be appreciated that when the tangs 44 and 46 are spread apart and the shank of the screw 49 rides within the slot 43 there will be a relative movement of the member 42 with respect to the transfer bar 27. When this occurs, the tang 46 will engage a switch 50 carried by the transfer bar. This switch is included in the control circuit for operating the tranfer bar; consequently, the transfer bar will be precluded from further movement.

There is also mounted on the section 37, a U-shaped bracket 45 having a pair of switch actuating members 55 and 60 secured thereto. When the transfer bar 27 moves toward the left, the member 55 actuates a switch 52 to reverse the operation of the drive mechanism. In a like manner when the transfer bar moves toward the right, the member 60 actuates a switch 53 to effectuate a reversal of the movement of the transfer bar. This movement of the transfer bar is accomplished by means of an air cylinder 56 controlled by a pair of solenoid operated valves 57 and 58. The air cylinder 56 operates a piston rod 59 connected through a bracket 61 to the transfer bar 27.

A cycle of operation of the transfer mechanism may be understood from a consideration of Fig. 6 wherein it will be noted that the closure of the switch 53 effectuates the energization of a relay 54 to draw up contacts 62 and 63. Closure of contact 62 completes an obvious locking circuit for the relay through a normally closed contact 64 associated with a relay 66. Closure of contact 63 energizes a solenoid 67 to operate the valve 58 to permit the entry of air into the cylinder 56 to drive the piston rod 59, bracket 61 and the transfer bar 27 toward the left as viewed in Fig. 1. When the switch 52 is operated by the member 55, the relay 66 is operated to interrupt a locking circuit for the relay 54 whereupon the solenoid 67 is deenergized to close the valve 58. Energization of relay 66 draws up a contact 68 to energize a solenoid 69 that functions to open the valve 57. Air is then permitted to enter the cylinder 56 to drive piston rod 59, bracket 61 and transfer bar 27 toward the right. When relay 54 is deenergized, a contact 71 is closed and deenergization of relay 66 closes a contact 72 to complete an obvious holding circuit for the relay 66 around the switch 52. This holding circuit is interrupted when the relay 54 again opens contact 71 when the member 60 again actuates the switch 53.

If the hook-like member 42 engages an obstruction, (such as shown in Fig. 5) so that the member cannot be pivoted thereover by the action of the cam 51, then the member will move relative to the transfer bar 27 to actuate the switch 50. Looking at Fig. 6, it will be noted that the switch 50 is included in the power supply of the control circuit for the air cylinder 56; consequently, upon opening of the switch 50 both the solenoids 67 and 69 will be deenergized to close the valves 57 and 58 and hold the transfer bar 27 from further movement.

It is to be understood that the above-described arrangements of apparatus and construction of elemental parts are simply illustrative of an application of the principles of the invention and many other modifications may be made without departing from the invention.

What is claimed is:

1. An article transfer mechanism comprising a transfer member, an article engaging element having an elongated slot forming a section of said element into two resilient tangs, and a stud mounted on said transfer member engaged by the tangs to hold the article engaging element on the transfer member by a slip joint.

2. An article transfer mechanism comprising a movably mounted bar, means for imparting a reciprocating movement to said bar, an article engaging element having an elongated slot running to one terminus thereof to provide two resilient tangs, said tangs having an aperture formed therein to intersect said slot, and a pivot shaft mounted on said bar and passing through said aperture to provide a slip joint between said bar and said element.

3. In an apparatus for advancing articles along a bed, a bar spaced from the bed and mounted for movement in a path parallel to the bed, means for imparting a reciprocating movement to said bar, a pivot stud mounted on said bar, and an article engaging member pivotally mounted on said stud, said member having an elongated slot formed therein extending through the pivotal mounting to the terminus of the member to provide a pair of resilient tangs encompassing the stud.

4. In an article transfer mechanism, a bed, a bar spaced from the bed and mounted for movement parallel to the bed, means for imparting a reciprocating movement to said bar, means mounted on the bar for advancing step-by-step articles on the bed, a member mounted by a slip joint to said bar for engaging and advancing each article, and means actuated by said member engaging an obstruction to move relative to said bar for interrupting operation of said means for reciprocating the bar.

5. In an article transfer mechanism, a bar mounted for movement, means for imparting a reciprocating movement to said bar, an article advancing element having a pair of spaced resilient tangs, a stud mounted on said bar and engaged between said tangs to provide a resilient slip joint between the article advancing element and the bar, and means mounted on said bar and actuated by relative movement between said element and said bar for interrupting movement of said bar.

6. In an article transfer mechanism for advancing articles along a bed, a bar spaced from said bed and mounted for movement parallel to said bed, means for imparting a reciprocating movement to said bar, an electrical circuit for controlling the operation of said reciprocating means, an article engaging element mounted by a slip joint on said bar, and a switch actuated by relative movement between said article engaging element and said bar for interrupting said electrical control circuit.

7. In an article transfer mechanism for advancing articles along a surface, a bar spaced from said surface and mounted for movement parallel to said surface, an article engaging element having an elongated slot running to one terminus of the element to provide a pair of resilient tangs, said element having an aperture formed therein to intersect the slot, a pivot stud mounted on said bar and projecting through said aperture to provide a slip-joint mounting for said element, a switch mounted on the bar in position to be opened by relative movement between the element and the bar upon the element being precluded from movement, and means including the switch for reciprocating the lever.

References Cited in the file of this patent

UNITED STATES PATENTS

| | | |
|---|---|---|
| 1,638,310 | Killebrew | Aug. 9, 1927 |
| 1,775,810 | Clark | Sept. 16, 1930 |
| 2,371,140 | Alling et al. | Mar. 13, 1945 |
| 2,482,427 | Melhorn | Sept. 20, 1949 |